W. T. TRUSTY.
GAME CARDS.
APPLICATION FILED AUG. 17, 1905.

1,036,166.

Patented Aug. 20, 1912.
2 SHEETS—SHEET 1.

Fig. 1.

3  1  2

| 1 GRADE | 2 GRADE | 3 GRADE | 4 GRADE | 5 GRADE |
|---|---|---|---|---|
| A ---- 1 | D ---- 5 | G ---- 9 | J ---- 13 | M ---- 17 |
| AB --- 2 | DE --- 6 | GH --- 10 | JK --- 14 | MN --- 18 |
| ABC -- 3 | DEF -- 7 | GHI -- 11 | JKL -- 15 | MNO -- 19 |
| AC --- 4 | DF --- 8 | GI --- 12 | JL --- 16 | MO --- 20 |

| 1 GRADE | 2 GRADE | 3 GRADE | 4 GRADE | 5 GRADE |
|---|---|---|---|---|
| AB -- 2 | DE --- 6 | GH --- 10 | JK --- 14 | MN -- 18 |
| ABC -- 3 | D --- 5 | G --- 9 | J --- 13 | M --- 17 |
| A --- 1 | DEF -- 7 | GHI -- 11 | JKL -- 15 | MNO -- 19 |
| AC -- 4 | DF -- 8 | GI -- 12 | JL -- 16 | MO -- 20 |

| 1 GRADE | 2 GRADE | 3 GRADE | 4 GRADE | 5 GRADE |
|---|---|---|---|---|
| ABC -- 3 | DEF -- 7 | GHI -- 11 | JKL -- 15 | MNO -- 19 |
| AB -- 2 | D --- 5 | G --- 9 | J --- 13 | M -- 17 |
| A --- 1 | DE --- 6 | GH --- 10 | JK --- 14 | MN -- 18 |
| AC -- 4 | DF -- 8 | GI -- 12 | JL -- 16 | MO -- 20 |

| 1 GRADE | 2 GRADE | 3 GRADE | 4 GRADE | 5 GRADE |
|---|---|---|---|---|
| AC -- 4 | DF -- 8 | GI -- 12 | JL -- 16 | MO -- 20 |
| ABC -- 3 | D --- 5 | G --- 9 | J --- 13 | M --- 17 |
| AB -- 2 | DE --- 6 | GH --- 10 | JK --- 14 | MN -- 18 |
| A --- 1 | DEF -- 7 | GHI -- 11 | JKL -- 15 | MNO -- 19 |

Witnesses
G. R. Thomas
E. M. Coolfard

Inventor
W. T. Trusty
By Chandler & Chandler
Attorney

COLUMBIA PLANOGRAPH CO., WASHINGTON, D. C.

W. T. TRUSTY.
GAME CARDS.
APPLICATION FILED AUG. 17, 1905.

1,036,166.

Patented Aug. 20, 1912.
2 SHEETS—SHEET 2.

Fig. 2.

| GRADE 6 | GRADE 7 | GRADE 8 | GRADE 9 |
|---|---|---|---|
| P — — 21 | S — — 25 | V — — 29 | Y — — 33 |
| PQ — 22 | ST — 26 | VW — 30 | YZ — 34 |
| PQR — 23 | STU — 27 | VWX — 31 | YZ& — 35 |
| PR — 24 | SU — 28 | VX — 32 | Y& — 36 |

| GRADE 6 | GRADE 7 | GRADE 8 | GRADE 9 |
|---|---|---|---|
| PQ — 22 | ST — 26 | VW — 30 | YZ — 34 |
| P — — 21 | S — — 25 | V — — 29 | Y — — 33 |
| PQR — 23 | STU — 27 | VWX — 31 | YZ& — 35 |
| PR — 24 | SU — 28 | VX — 32 | Y& — 36 |

Fig. 3.

4

Miss Jones
The
Teacher

| GRADE 6 | GRADE 7 | GRADE 8 | GRADE 9 |
|---|---|---|---|
| PQR — 23 | STU — 27 | VWX — 31 | YZ& — 35 |
| P — — 21 | S — — 25 | V — — 29 | Y — — 33 |
| PQ — 22 | ST — 26 | VW — 30 | YZ — 34 |
| PR — 24 | SU — 28 | VX — 32 | Y& — 36 |

| GRADE 6 | GRADE 7 | GRADE 8 | GRADE 9 |
|---|---|---|---|
| PR — 24 | SU — 28 | VX — 32 | Y& — 36 |
| P — — 21 | S — — 25 | V — — 29 | Y — — 33 |
| PQ — 22 | ST — 26 | VW — 30 | YZ — 34 |
| PQR — 23 | STU — 27 | VWX — 31 | YZ& — 35 |

Witnesses
G. R. Thomas
E. M. Colfard

Inventor
W. T. Trusty
By Chandler & Chandler
Attorney

UNITED STATES PATENT OFFICE.

WILLIAM T. TRUSTY, OF PINE VALLEY, MISSISSIPPI.

GAME-CARDS.

1,036,166.

Specification of Letters Patent.

Patented Aug. 20, 1912.

Application filed August 17, 1905. Serial No. 274,568.

*To all whom it may concern:*

Be it known that I, WILLIAM T. TRUSTY, a citizen of the United States, residing at Pine Valley, in the county of Yalobusha, State of Mississippi, have invented certain new and useful Improvements in Game-Cards; and I do hereby declare the following to be a full, clear, and exact description of the invention, such as will enable others skilled in the art to which it appertains to make and use the same.

This invention relates to playing cards and has for its principal object to provide a card game of such nature as to amuse and also to educate children.

Another object of the card game resides in the provision of a pack of cards arranged in sets according to grades in the public schools, there being a single card, equal as regards points, to any one of the different sets.

With these and other objects in view the present invention consists in the combination and arrangement hereinafter more fully described, shown in the accompanying drawings and particularly pointed out in the claims hereto appended, it being understood that changes in the form, proportion, size and minor details may be made without departing from the spirit or sacrificing any of the advantages of the invention.

In the drawings: Figure 1 illustrates a portion of a complete pack of cards. Fig. 2 illustrates another portion of the said pack of cards, and Fig. 3 illustrates the "teacher" card.

Referring to the drawings, it will be seen that thirty-seven cards are employed in the game and these cards are divided into sets of four cards each together with a single card, referred to hereinafter as the "teacher" card. Each card with the exception of the teacher card is provided with three letters of the alphabet and four consecutive numbers together with the name or number of the grade of a school. Taking up first the first grade set of cards it will be seen that they are arranged in vertical alinement for the purpose of illustration, and that each card of this set includes the first three letters of the alphabet as indicated by the reference character 1. The letters employed in this set are A, B and C, and these are arranged in four lines upon each card, in such a way that the positions of the letters on one card vary with respect to the positions of the letters on the other cards. Associated with each line of letters are numbers, designated by the reference character 2. The numbers in this particular set are 1, 2, 3 and 4, the said numbers are like the letters arranged in four lines, each figure being placed on the card adjacent the said letters. These numbers are interchanged on the cards in the same manner as the letters above mentioned. By this arrangement 1 will be associated with A on each card, 2 with A—B; 3 with A—B—C on each card and 4 with A—C on each card. Thus it will be noted that each number is arranged adjacent a particular letter or group of letters and is employed consecutively therewith. The second set of cards, identified as second grade cards, include the letters D, E and F and the numerals 5, 6, 7 and 8. The next set or the third grade cards include the letters G, H and I, and the numerals 9, 10, 11 and 12. The following sets of cards are likewise provided with corresponding numbers and letters. The cards of each set are respectively provided across one corner with the name of the particular grade, as indicated by the reference character 3.

The "teacher" card differs materially from the other cards in that it is devoid of any letters or numbers such as are associated with the before mentioned cards. On this card is printed the words "The teacher" together with any desired name for the teacher, as indicated by the reference character 4. This card however has a value in the final counting of the game as any one complete set of the cards.

In practice in order to play the game the cards including the teacher card are well shuffled, after which one may deal the cards one at a time to the players until each player has received two cards in this manner. Any number of people may play the game at one time. The players then take up their cards, the party to the left of the dealer having first call. This particular player demands of another player a card he desires and obviously a card to match one of the cards he holds in his hand. A player in calling for the card understands which card to call for by the numbers and letters below the top line. For instance, if the player has a fifth grade card, that is the card having the letters M, N and O with the numerals from 17 to 20 inclusive, and that card is the card with MN—18 at the top. The player ascertains from the numbers below the MN—18 on that card that the deck contains three other cards, they being M—17, MNO—19, and MO—20. He thereupon calls for one of these cards thus: "Give me MO—20", demanding that card from some particular player. A draw may be made from any particular player designated by the commanding player and in the event that he fails to get the card he wishes, he may then draw one card from the cards remaining in the pack not dealt. If failure attends his effort the next player to the left takes his turn. If the first player should get the card he desires either from another player or from the deck, he may continue to call upon his fellow-players until he fails to get the cards through the two changes given him. Four cards represent one grade and when a player collects four cards of a grade he scores one point. The "teacher card" is one point, and in the event that there should be a tie in points, the player holding the first grade set wins the game. It will be noted that as each child holds the various cards in his hand his attention will be always directed to the various letters and numbers which are on the said cards.

Referring more particularly to the first grade set of cards it will be seen that the child will be able in time to separate the letter A, B or C; that he will be able to pick out the various figures. It is a well known fact that children of the age to begin school or those of the age just prior to that have not the ability to quickly grasp and retain the various outlines of letters and figures and that it is necessary for the outlines to be constantly before them in order to impress the same upon their minds.

In teaching the children the numbers, it will be necessary to point out the numbers on the corners of the cards which represent the grades, and then the numbers on the right hand side of the cards will be pointed out by the teacher and taught to the children. The children will also be taught the letters by having them pointed out on the cards and by reason of the fact that on each card certain letters are arranged other than in their alphabetical sequence, the child will be taught to pick out and recognize the letters whether or not they are in sequence.

What I claim is:—

1. A game apparatus comprising a deck of cards divided into sets of equal number, and a supplementary card, the cards of each set being provided with a grade designation at the upper left hand corner and columns of sets of consecutive letters of the alphabet and sets of consecutive numbers, the letters and numbers of each card set being arranged differently on each card, the supplementary card being designated by the words "The teacher."

2. A game apparatus comprising a deck of cards divided into sets of equal number, the cards of each set being provided with a grade designation at the upper left hand corner and columns of sets of consecutive letters of the alphabet and sets of consecutive numbers, the letters and numbers of each card set being arranged differently on each card.

In testimony whereof, I affix my signature, in presence of two witnesses.

WILLIAM T. TRUSTY.

Witnesses:
H. W. FULLER,
J. R. TRUSTY.

Copies of this patent may be obtained for five cents each, by addressing the "Commissioner of Patents, Washington, D. C."